3,152,949
REINFORCED PLASTIC ARTICLE WITH IMPROVED SURFACE PROPERTIES
Roger T. Guthrie, Asheville, N.C., assignor to American Enka Corporation, Enka, N.C., a corporation of Delaware
Filed Nov. 2, 1960, Ser. No. 66,692
2 Claims. (Cl. 161—92)

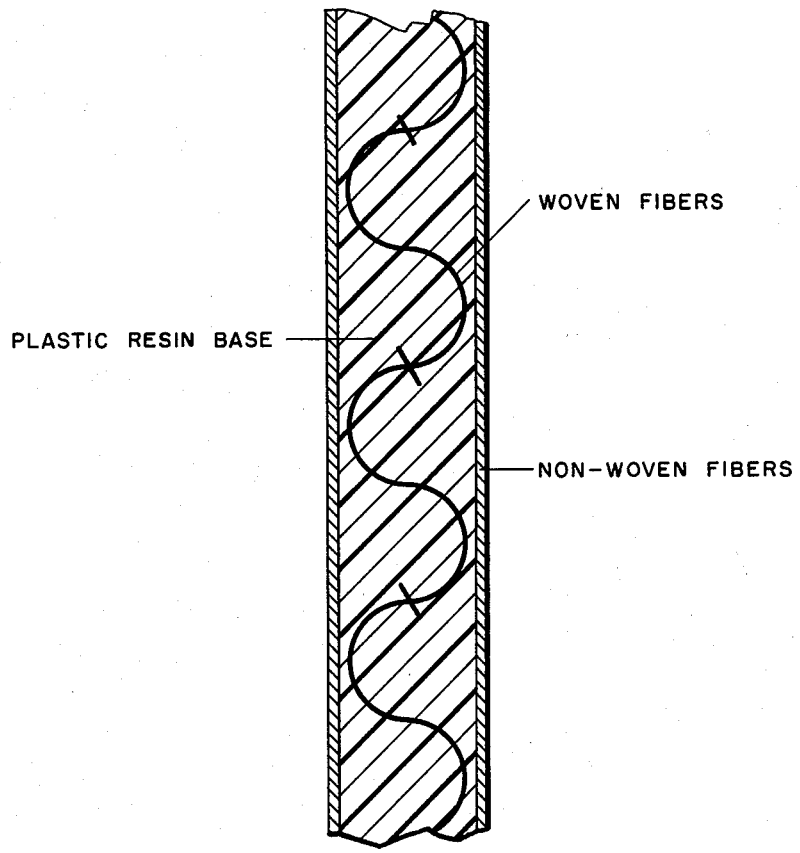

This invention relates in general to reinforced plastic material and more particularly to reinforced plastic material having a basis of a synthetic resin containing reinforcing filamentary materials in the form of a skein, staple fiber, woven and non-woven fabrics, webs, and mats, or combinations of two or more of these constructions.

Reinforced or laminated articles in the form of sheets, rods and other shapes and having a basis of synthetic resin, particularly styrene/divinylbenzene copolymer, reinforced with a glass filamentary material, have found extensive electronic use in radio frequency, microwave electronic equipment, and other devices. However, such materials have not been completely satisfactory at high radio frequencies because of their tendency to heat, because they had a very low impact strength, and because they had a dielectric constant barely within the acceptable limits for some high frequency uses. Moreover, when this glass-reinforced synthetic resin was subjected to slight strain, it exhibited a marked tendency to delaminate. Furthermore, the hydrophilic nature of the glass filamentary material resulted in undesirably high sorption of moisture.

Plastic synthetic resinous articles reinforced by polyolefinic filamentary materials have been proposed in a previous application, Serial No. 834,631, filed August 19, 1959, now abandoned, and owned in common herewith. These resinous articles consist normally of a uniform, homogeneous synthetic resin having embedded therein for reinforcement purposes staple fiber, or woven and non-woven fabrics, webs, mats, or other forms of polyolefinic filamentary material. The reinforcing filamentary material in whatever form used occupies a fraction of the total thickness of the synthetic resin, which fraction normally is on the order of from 6 to 67% by weight of the total weight of the finished article. Any filament-forming polyolefin having a melting point of above 100° C. is suitable for use as the basis of the reinforcing material. Examples of such polyolefins are polypropylene, poly(3-methyl-1-butene), poly(4-methyl-1-pentene), poly(4,4'-dimethyl-1-pentene), poly(4,4'-dimethyl-1-hexene), poly(3-cyclopentyl-1-propene), and polyvinylcyclohexane, as well as high-density polyethylene (polymethylene). The properties of polypropylene and polyethyene are well known and need not be set out herein. The properties of the other poly-α-olefins mentioned above are given in the Journal of Applied Polymer Science, volume 1, pages 73–83 (1959).

The synthetic resinous articles of the above type were fashioned in such a way that there was intimate contact between the synthetic resin and substantially the entire surface of the reinforcing polyolefinic filamentary material while preventing the entrapment of gases in the finished article. It was found that desirable electrical properties are obtained by such contact and that the possibility of delamination and strength loss can be reduced somewhat by insuring proper contact and prevention of entrapped gases. It was found, additionally, that the use of polypropylene filamentary material affords excellent contact with the resin and thus contributes further to the prevention of delamination.

These prior resinous articles are formed by positioning the polyolefinic fiber, fabric, etc., between casting surfaces, then introducing between the surfaces a low viscosity liquid polymerizable into a synthetic resin and then polymerizing the liquid. The liquid should preferably be polymerizable predominantly by the addition mechanism in order to prevent the formation of entrapped non-resinous by-products. The synthetic resins which may be used must satisfy the foregoing requirements. Examples of such synthetic resins include polymers of styrene, vinyl chloride, vinyl acetate, methyl acrylate, methyl methacrylate, epoxy compounds, allyl diglycol carbonates and low molecular weight polyesters. The polymerization may be accelerated by the addition to the synthetic resins of from 0.005 to 0.5% by weight thereof of a free radical catalyst such as benzoyl peroxide, isopropyl percarbonate, or tertiary butyl perbenzoate.

These synthetic resins may be either linear or cross-linked, as by copolymerizaiton of one of the above with a cross-linking compound such as divinylbenzene or tung oil when used with styrene in amounts of from 0.1 to 25%. Such cross-linked resins are the preferred compounds because they are infusible and therefore can be used at elevated temperatures.

The liquid resin-forming material should be of sufficiently low viscosity that it will penetrate the polyolefinic material. It should also wet or adhere to the material to insure intimate contact.

These reinforced plastic articles were prepared as follows: The reinforcing material is placed upon a glass plate. A flexible dam strip of rubberlike material, e.g., plasticized polyvinylchloride, is laid around the outer edge of the reinforcing material, and a second glass plate is used to cover the assembly and complete the enclosure. The dam strip is slightly greater in thickness than that of the reinforcing material and serves not only to enclose the space between the glass plates, but also prevents the glass plates from pressing on the reinforcing material. In addition, the dam strip serves to keep these plates parallel. Clamps or other securing means are placed around the plates to insure airtight contact between the glass and the strip. It should be understood that a mold could be used equally well.

The assembled mold is next filled with the polymerizable liquid. This may be done by siphoning the liquid in from the bottom when the mold is on end or by pulling it in by vacuum.

The polymerizable liquid consists of about 89% by weight of styrene, 11% by weight of divinylbenzene (55% grade, commercial), and about 0.2% by weight of an accelerator, benzoyl peroxide. It should be understood that in place of the styrene/divinylbenzene copolymer, any combination of monomeric liquids polymerizable into a resin could be employed. In any case, the use of the above mentioned hydrocarbon polymer fibers will improve the impact strength and dielectric constant of the resinous article.

The polymerizable liquid is introduced at a controlled rate so as to permit thorough impregnation of the reinforcing material and elimination of air without entrapment. A convenient method for obtaining the proper filling rate is to observe the surface level of the rising liquid. If it is at a rate faster than proper, the surface level will bow downwardly, whereas if it is at the proper level, the surface will be substantially flat. After filling is completed, the mold is sealed with collodion at the entrance and exit points.

The assembly is then processed to cause polymerization of the resin forming liquid. This is accomplished by maintaining it at a temperature of 40–45° C. for two to four days, then at 60° C. for two days, at 80° C. for one day, and finally at 110° C. for two days. This method is only one example of one method for accomplishing polymerization. It may also be carried out in a sealed mold by maintaining an endothermic-exothermic system through the states of increasing viscosity, gelation and hardness to result in a high molecular weight addition polymer substantially free of monomer. Normally there will be less than 0.25% monomer present in the final product. When polymerization is completed, the assembly is taken apart and the reinforced article is obtained.

When polypropylene fiber or fabric is used as the reinforcing material, there is obtained a resinous article having a low dielectric constant and high impact strength quite superior to those obtained when the reinforcing material is made of glass fibers or fabric.

Since excellent results are obtained by the use of a fabric of polypropylene fibers as the reinforcing material, the invention will be described in connection therewith, it being understood that, as indicated above, any reinforcing material made of fibers and filaments of filament forming polyolefins having a melting point above 100° C. may be employed.

While the prior reinforced plastic materials described above have satisfactory strength and electrical properties, they suffered from a serious disadvantage, namely, it was difficult to machine, i.e., sand and grind, the same where the reinforcing material was polypropylene. This was due to the fact that the thermoplastic polypropylene filamentary reinforcing material melted under the frictional heat developed by the machining operations. The abrasive surface of the sanding or grinding tool and the surface of the resinous base become clogged with molten or softened polypropylene. Accordingly, these machining operations could be performed only by a skilled machinist, using coarse grit, taking light cuts, and even cooling the work with a water spray.

Moreover, polypropylene on the surface of the resinous base, such as will be the case when polypropylene-reinforced resinous articles are machined, causes difficulty in adhesive bonding of the machined article. This bonding problem cannot be solved easily as long as any appreciable fraction of the surface is coated with polypropylene, because the poly-α-olefines are so inert chemically that no satisfactory bonding agent is available for joining such surfaced articles.

Accordingly, an important object of this invention is to provide a surface on plastic resinous articles which will be free from the foregoing and other disadvantages.

Another object of this invention is to provide a plastic resinous article with at least one coating of a material which may be machined without softening or melting so that no clogging of the machining tool surfaces takes place.

Still another object of this invention is to provide a plastic article with at least one surface mat or web of non-woven olefinic fibers.

Another object of this invention is to provide a plastic article with at least one surface mat or web of non-woven glass fibers.

Another object of this invention is the provision of a plastic material reinforced with a poly-α-olefin fabric and on at least one surface of which is bonded a mat or web of non-woven fibers of the same poly-α-olefin as the reinforcing fabric.

It is another object of this invention to provide a novel process for preparing a thermoplastic polyolefinic fabric-reinforced plastic resinous article having a bondable surface.

A further object of this invention is the provision on plastic resinous articles of coatings in the form of mats or webs of non-woven fabric.

Other objects and advantages of this invention will appear from the following detailed description.

The accompanying drawing shows diagrammatically an enlarged, fragmentary, sectional view of a laminated article embodying this invention.

In accordance with this invention, plastic resinous articles to be subjected to machining operations are surfaced on at least the side to be machined with a mat or web of non-woven fabric. While it is preferred to employ mats or webs of non-woven fabric having a basis of the same material as the reinforcing fabric of the plastic article, it is also feasible to use non-woven glass fabrics for the surfacing mats or webs. Due to the separated state of the fibers of the non-woven fabric, the fibers tend to break off easily during the machining, i.e., sanding and grinding, operations effected on the surfaced reinforced plastic articles with the result that no melting of the fibers occurs as would be the case if the surface mats or webs were of woven fabric.

The mats or webs of the non-woven fabric are preferably bonded to the plastic article during the molding operation of the latter with the surface mat or web exposed. The thickness of the laminate of plastic article and surface mat or web should be such that the plastic article is of the required dimensions when the non-woven surface or surfaces are essentially removed by the machining operations. The machining operations should not expose the reinforcing fabric.

For most electrical applications, the non-woven glass surface mat is satisfactory. However, a non-woven polypropylene surface mat is more advantageous in microwave application where the wave length is about one centimeter or less, as at these wave lengths the electrical discontinuities caused by glass would become important.

The following example is cited to illustrate a preferred embodiment of this invention, but it is not intended to limit it in any manner.

*Example*

A non-woven mat of polypropylene fibers is placed on a glass plate, and one or more layers of a woven fabric, such as 10-harness satin made of polypropylene yarn, are placed upon this mat. Upon this woven fabric may be placed another mat of non-woven fabric prepared from fibers of polypropylene. A flexible dam strip of plasticized polyvinylchloride is laid around the outer edge of the assembly, a cover plate of glass placed on top, and the plates are clamped together.

The assembled mold is then filled with a polymerizable liquid mixture consisting of about 89% styrene, 11% divinylbenzene (55% grade, commercial), and about 0.2% of benzoyl peroxide, the parts being by weight. After the mold is filled, it is sealed with collodion. The assembly is then subjected to polymerization conditions such as described hereinabove.

The laminate produced has a satisfactory dielectric constant and impact strength. When the surfaces are subjected to a sanding or grinding operation, it is found that the sanding or grinding surfaces are not filled with melted polypropylene particles, nor is there any evidence of melted polypropylene fibers on the abraded surfaces of the reinforced plastic article.

Alternatively, a non-woven glass mat may be substituted for the polypropylene mat. This substitution is sometimes advantageous when a finished product with lower coefficient of thermal expansion is desired. For this purpose, several layers of the glass mat may be used.

It should be understood that many modifications or additions may be made in the practice of this invention without departing from the spirit thereof, which is to be limited only to the extent of the following claims.

What is claimed is:

1. A rigid reinforced synthetic resin article having good dielectric properties and high impact strength at least one surface of which may be machined by sanding and grinding to provide a bondable surface without clogging the machining tool comprising, a synthetic resin base consisting of a copolymer of styrene and divinylbenzene, a woven polypropylene reinforcing fabric imbedded in said base, and a mat of non-woven polypropylene fibers imbedded in at least one surface of said base.

2. A rigid reinforced synthetic resin article having good dielectric properties and high impact strength at least one surface of which may be machined by sanding and grinding to provide a bondable surface without clogging the machining tool comprising, a synthetic resin base consisting of a copolymer of styrene and divinylbenzene, a woven polypropylene reinforcing fabric imbedded in said base and a mat of non-woven glass fibers imbedded in at least one surface of said base.

References Cited in the file of this patent

UNITED STATES PATENTS

| | | |
|---|---|---|
| 2,484,787 | Grant | Oct. 11, 1949 |
| 2,530,441 | Reinhardt et al. | Nov. 21, 1950 |
| 2,743,207 | Rusch | Apr. 24, 1956 |
| 2,773,781 | Rodman | Dec. 11, 1956 |
| 2,784,763 | Shorts | Mar. 12, 1957 |
| 2,836,529 | Morris | May 27, 1958 |
| 2,870,455 | Reeves | Jan. 27, 1959 |
| 2,980,574 | Menzer | Apr. 18, 1961 |

FOREIGN PATENTS

| | | |
|---|---|---|
| 538,782 | Belgium | Dec. 6, 1955 |
| 837,594 | Great Britain | June 15, 1960 |